United States Patent
Soane et al.

(10) Patent No.: US 10,012,061 B2
(45) Date of Patent: Jul. 3, 2018

(54) FORMULATIONS AND METHODS FOR REMOVING HYDROCARBONS FROM SURFACES

(71) Applicant: Soane Energy, LLC, Cambridge, MA (US)

(72) Inventors: David S. Soane, Chestnut Hill, MA (US); Rosa Casado Portilla, Peabody, MA (US); Robert P. Mahoney, Newbury, MA (US); Gangadhar Jogikalmath, Cambridge, MA (US); Philip Wuthrich, Belmont, MA (US); Ian Slattery, Arlington, MA (US)

(73) Assignee: Soane Energy, LLC, Cambridge, MA (US)

( * ) Notice: Subject to any disclaimer, the term of this patent is extended or adjusted under 35 U.S.C. 154(b) by 20 days.

(21) Appl. No.: 14/525,676

(22) Filed: Oct. 28, 2014

(65) Prior Publication Data
US 2015/0101815 A1    Apr. 16, 2015

Related U.S. Application Data

(63) Continuation-in-part of application No. 13/103,584, filed on May 9, 2011, now Pat. No. 8,967,258.

(60) Provisional application No. 61/982,486, filed on Apr. 22, 2014, provisional application No. 61/897,030, filed on Oct. 29, 2013, provisional application No. 61/379,783, filed on Sep. 3, 2010, provisional application No. 61/333,085, filed on May 10, 2010.

(51) Int. Cl.
| | |
|---|---|
| E21B 43/22 | (2006.01) |
| E21B 43/16 | (2006.01) |
| E21B 43/24 | (2006.01) |
| E21B 43/26 | (2006.01) |
| C09K 8/524 | (2006.01) |
| C09K 8/588 | (2006.01) |
| C09K 8/594 | (2006.01) |

(52) U.S. Cl.
CPC .......... *E21B 43/2406* (2013.01); *C09K 8/524* (2013.01); *C09K 8/588* (2013.01); *C09K 8/594* (2013.01); *E21B 43/16* (2013.01); *E21B 43/26* (2013.01)

(58) Field of Classification Search
CPC ........ C09K 8/68; C09K 2208/30; C09K 8/52; C09K 8/584; C09K 8/588; E21B 43/16; E21B 37/06
See application file for complete search history.

(56) References Cited

U.S. PATENT DOCUMENTS

| | | | |
|---|---|---|---|
| 3,258,071 A | 6/1966 | Shen et al. | |
| 4,592,849 A * | 6/1986 | McMillen | B01D 17/045 210/799 |
| 5,192,461 A | 3/1993 | Tomaszewski et al. | |
| 5,406,019 A | 4/1995 | Dean | |
| 6,077,884 A | 6/2000 | Hess et al. | |
| 7,608,571 B2 | 10/2009 | Fütterer et al. | |
| 7,871,963 B2 | 1/2011 | Stokes et al. | |
| 7,906,464 B2 * | 3/2011 | Davidson | C09K 8/52 507/235 |
| 2002/0033379 A1 | 3/2002 | Hayashi et al. | |
| 2004/0110643 A1 | 6/2004 | Zevallos | |
| 2004/0152601 A1 * | 8/2004 | Still | C09K 8/03 507/100 |
| 2005/0194292 A1 | 9/2005 | Beetge et al. | |
| 2007/0054832 A1 | 3/2007 | Hocking et al. | |
| 2008/0194435 A1 | 8/2008 | Huff et al. | |
| 2008/0217013 A1 | 9/2008 | Stokes et al. | |
| 2008/0249339 A1 | 10/2008 | Stokes et al. | |
| 2009/0075845 A1 | 3/2009 | Abad et al. | |
| 2009/0188669 A1 | 7/2009 | Berg | |
| 2010/0075880 A1 | 3/2010 | Dupont et al. | |
| 2011/0272325 A1 | 11/2011 | Soane et al. | |
| 2013/0048285 A1 * | 2/2013 | Boulard | C09K 8/12 166/293 |
| 2014/0128296 A1 | 5/2014 | Soane et al. | |
| 2014/0152601 A1 | 6/2014 | Hung et al. | |

FOREIGN PATENT DOCUMENTS

| | | |
|---|---|---|
| CA | 2656294 A1 | 1/2008 |
| CA | 2721949 A1 | 10/2009 |

* cited by examiner

*Primary Examiner* — Zakiya W Bates
(74) *Attorney, Agent, or Firm* — Elmore Patent Law Group, P.C.; Mahreen Chaudhry Hoda; Carolyn S. Elmore

(57) ABSTRACT

The invention provides formulations for facilitating the removal of oil from a surface using a chisel composition, wherein the chisel composition includes a polymer having one or more binding points with a high affinity for the surface, and one or more hydrophilic segments that form a hydrophilic coating on the surface, rendering the surface water-wet and thereby facilitating the removal of oil from the surface. The invention also provides for methods of use of such formulations.

21 Claims, No Drawings

FORMULATIONS AND METHODS FOR REMOVING HYDROCARBONS FROM SURFACES

RELATED APPLICATIONS

This application is a continuation-in-part of U.S. application Ser. No. 13/103,584, filed May 9, 2011, which claims the benefit of U.S. Provisional Application Ser. No. 61/333,085 filed May 10, 2010 and U.S. Provisional Application Ser. No. 61/379,783 filed Sep. 3, 2010; this application also claims the benefit of U.S. Provisional Application No. 61/897,030 filed Oct. 29, 2013 and U.S. Provisional Application No. 61/982,486 filed Apr. 22, 2014. The entire teachings of the above applications are incorporated herein by reference.

FIELD OF THE APPLICATION

The application relates generally to removing hydrocarbons from surfaces and preventing hydrocarbons from adhering to surfaces, e.g., in oil and gas reservoirs.

BACKGROUND

A considerable portion of the world's hydrocarbon endowment exists in carbonate geological formations, while other oil-bearing and natural gas reservoirs are found in sandstones, coalbeds, salt layers, or shales. As these oil and gas reservoirs mature during production, it becomes increasingly difficult to recover the residual hydrocarbons that they still contain. The recovery of hydrocarbons from mature reservoirs tends to be low for two reasons: the reservoirs have low porosity, and the reservoir rock is oil-wet. The combination of these factors means that when oil and gas flow towards the wellbore for production to the surface, there is diminished flow of the oil and gas. The oil-wet and reduced porosity conditions also reduce productivity when enhanced oil recovery (EOR) techniques are employed, such that the injected EOR fluids will bypass the oil that resides in the rock matrix. This problem is not limited to mature reservoirs. During conventional, primary or secondary production of hydrocarbon fluids, the reduced porosity and oil wet conditions reduce the productivity of the well. For example, formation damage occurs by deposition of asphaltenes, condensates, and waxes. The prevention of this type of deposit would avoid the loss of productivity.

The oil-wet state of the reservoir can be caused by asphaltene deposition. Asphaltenes, naturally-occurring components of crude oil, are a complex mixture of aromatic structures that have carboxyl functional groups, characterized, for example, by being insoluble in heptane. Their low solubility leads to their precipitation and deposition onto rock surfaces, causing an oil-wet condition. The permeability of the pores in the carbonate formation is thus reduced as the asphaltene on the surface rock plugs the pore throats. In addition to asphaltenes, gas condensates and waxes form during production, creating an oil-wet condition on the surfaces and in the pores of the petroleum-bearing geologic formation. Gas condensates are liquid or waxy organic materials that deposit in the near-wellbore region, including the fractured zones and proppant packs, of gas producing wells. Waxes are heavy oil fractions or paraffinic materials that can adhere to surfaces.

Removing asphaltenes, condensates, and waxes from oil-containing formations remains an important challenge for oil and gas recovery operations, especially for mature wells where enhanced oil recovery techniques are to be employed. Current approaches to this problem include: (1) dissolving the asphaltenes by treatment with aromatic solvents such as xylene or toluene, or by treatment with dendrimeric polymers; (2) injecting chemicals into the formation to prevent asphaltene deposition; and (3) altering the wettability of the formation. The first two technologies provide only temporary solutions, because they do not slow down the ongoing process of asphaltene deposition. These technologies are also expensive, and incomplete in their ability to treat the entire formation at one time. By changing the wettability of the formation from oil-wet to water-wet, it may be possible to effect a more durable change. Treatment fluids for changing the wettability have been proposed that include, e.g., lignosulfates (see, for example, U.S. Pat. No. 6,051,535) or nanoparticles (see, for example, U.S. Pat. No. 4,579,572). However, conditions in the reservoir are harsh and inhospitable to chemical manipulations. Moreover, permeability and porosity of the well should be preserved or enhanced with any proposed treatment. Therefore, there remains a need in the art for well treatment methods that can enhance the recovery of oil from existing oil reservoirs, while avoiding deleterious effects on the recovery efficiency of the formation.

Oil recovery can also be enhanced by treating the wellbore itself, by treating the formation in workover operations, or by treating the formation as fracturing fluid ("frac fluid") is installed. The wall of the wellbore can become clogged with fluids that have contacted it, such as asphaltenes, waxes and other hydrocarbon materials from the well, and wellbore oil that has been used during drilling processes. The formation matrix, especially the near wellbore area of the formation, can also become clogged with such deposits. Paraffin deposits can form because of a decrease in temperature below the wax appearance temperature of the oil. Asphaltene deposits can form because of agglomeration, oxidation or chemical interaction of maltene content with incompatible fluids, or pressure or temperature changes. Such deposits can develop in the wellbore and in the formation throughout the lifecycle of the well. Treatments for these organic deposits have included various aromatic solvents and surfactants, as well as high intensity acoustic sources, injection of deasphalted oil, cleaning with carbon dioxide, use of microorganisms, etc.

Acids have been used for oil well treatments aimed at improving productivity. For example acid fracturing is a commonly used technique for increasing the production of oil from a carbonate geological formation. During the acid fracturing treatment a fluid is introduced at sufficient pressure to form fractures in the formation. Acid is then injected into the fracture to chemically react and etch the face of the fracture. The result is that channels are created and the productivity of the well is increased.

Acids are also used in acid treatment aiming at restoring formation damages. In this case the acid is used in areas near the wellbore to reverse the formation damage and restore well productivity. Another application of acids is to reverse the wettability of the formation from oil to water wet. This is particularly relevant in carbonate formations where the asphaltenes tend to deposit on the carbonate surface forming a strong interaction. The oil wet state results in a low success in enhanced oil recovery technique because the injected fluids tend to bypass the oil. Acid has shown to be useful in these situations where the chemical reaction between acid and carbonate help to detach the oil from the rock. Currently several acids are used for these applications including: mineral acids (hydrochloric acid, hydrofluoric acid, or their mixtures); organic acids (acetic acid, formic acid, chloroacetic acid, sulfamic acid, etc.). However these acids tend to be precipitated or consumed relatively quickly and near the wellbore, losing their ability to react deep into the formation or treat surfaces for extended periods of time. One solution is to protect the acid in such a way that it will not be rapidly precipitated or consumed near the wellbore.

There remains a need in the art, therefore, for technologies to improve the cleanout of near wellbore oily deposits to enhance flow of oil into the wellbore. In addition, for reservoirs where hydraulic fracturing is employed, it is desirable to prevent the buildup of hydrophobic residua on the rock surfaces and on the proppant materials. Preventing the accumulation of such residua can improve the efficiency of the hydraulic fracturing endeavor and can improve well productivity.

SUMMARY

1. Formulations

Disclosed herein, in embodiments, are formulations for facilitating the removal of oil from a surface, comprising a chisel composition, wherein the chisel composition comprises a polymer having one or more binding points with a high affinity for the surface, and one or more hydrophilic segments that form a hydrophilic coating on the surface, rendering the surface water-wet and thereby facilitating the removal of oil from the surface. In embodiments, the surface can comprise carbonate rock or metal. In embodiments, the polymer comprises polyphosphoric acid (PPA), and the PPA can be protected by a protected mechanism, to form protected PPA. In embodiments, the polymer is a functionalized polymer. The functionalized polymer can be protected by the protective mechanism to form a protected polymer. In embodiments, the protective mechanism can be selected from the group consisting of polymer encapsulation, polymer entrapment within a matrix, and polymer masking with a masking agent, or the protective mechanism can comprise using a non-hydrolyzing diluent for the PPA or salts thereof. In embodiments, the polymer can be adapted for controlled release, and the controlled release can be actuated by a triggering mechanism. In embodiments, the controlled release can be accomplished by a mechanism selected from the group consisting of dissolution, diffusion, pH change, ionic strength change and temperature change. In embodiments, the functionalized polymer can be end-functionalized, or functionalized along a polymer backbone. In embodiments, the binding points have high affinity for calcium carbonate ($CaCO_3$) or for silica. In embodiments, the formulation can also comprise a surfactant. In embodiments, the formulation can comprise an additive selected from the group consisting of dispersants, antiscalants, antifoulants, crystal modifiers, and paraffin inhibitors. In embodiments the formulation can comprise a viscosity-increasing additive.

In other embodiments, a molecular chisel formation is disclosed as set forth above in the preceding paragraph, in combination with a protective mechanism. In embodiments, the chisel composition in this formulation comprises PPA. In embodiments, the protective mechanism can be a protective mechanism. In embodiments, the protective mechanism can delay the hydrolysis of the PPA.

In other embodiments, a molecular chisel formulation as disclosed above can further comprise a non-hydrolyzing diluent, which can be selected from the group consisting of oil-based carrier fluids, glycolic acid, acetic acid, glycols, polyglycols, polyethylene glycols, and glycol ethers. In embodiments, the non-hydrolyzing diluent can be acetic acid. In embodiments, the molecular chisel formulation can be combined with a foam-former to produce a foam formulation.

2. Methods

Further disclosed herein, in embodiments, are methods for reducing the attachment of oil to a surface, comprising providing the molecular chisel formulation as described in the first "Formulations" paragraph, and directing the molecular chisel formulation into contact with the surface, thereby providing a water-wet surface that impairs the attachment of oil and reduces the attachment of oil thereto. In embodiments, the surface is selected from the group consisting of a $CaCO_3$ surface, a silica surface, and a metal surface. The method can further comprise a step of exposing the surface to a surfactant prior to, simultaneous with, or following the step of directing. Disclosed herein, in addition, are methods for recovering oil from a formation containing oil retained on a rock surface, comprising providing the molecular chisel formulation as described in the preceding paragraph, directing the molecular chisel to contact the rock surface, thereby rendering the rock surface water wet and thereby impairing the attachment of oil thereto, and recovering oil from the formation after the attachment of the oil to the surface has been impaired by the preceding step. Also disclosed is an oil produced by this method.

Also disclosed herein, in embodiments, are methods for mobilizing oil from a reservoir formation comprising providing an oil retrieval formulation comprising a fracturing fluid and the formulation disclosed in the first "Formulations" paragraph, and fracturing the formation with the oil retrieval formulation, thereby mobilizing the oil for retrieval. Disclosed herein, too, are retrieved oils, where such retrieved oils are mobilized by the preceding method.

Further disclosed herein, in embodiments, are methods of preconditioning a petroleum-bearing reservoir, comprising providing the molecular chisel formulation as disclosed above, and adding the formulation to a petroleum-bearing reservoir prior to carrying out an oil production process from the reservoir, wherein the molecular chisel formulation pretreats the reservoir to facilitate oil production therefrom. In embodiments, the petroleum-bearing reservoir is an oil sands reservoir. In embodiments, the oil production process is a steam-assisted gravity drainage process.

Disclosed herein, in other embodiments, are methods for preventing deposition of an oil on a surface, comprising providing the formulation disclosed in the first "Formulations" paragraph, directing the formulation into contact with the surface, and exposing the surface to the formulation to prevent deposition of the oil thereupon. In embodiments, the surface is a metal surface, which may be selected from the group consisting of a storage vessel surface, a separator vessel surface, a pipeline surface, and a valve surface. In embodiments, the formulation is directed by continuous feeding into contact with the surface. In embodiments, the surface is exposed to the formulation prior to exposing the surface to the oil, thereby preventing subsequent corrosion or fouling of the surface by the oil. Disclosed herein, in other embodiments, are methods of facilitating the removal of oil residua from a near wellbore region, comprising providing the formulation disclosed in the first "Formulations" paragraph, and directing the formulation into contact with the near wellbore region to impair attachment of the oil residua thereto, thereby loosening the oil residua from the attachment and facilitating their removal from the near wellbore region. In embodiments, oil residua can comprise asphaltenes, paraffins or waxes.

DETAILED DESCRIPTION

1. Compositions and Formulations Generally

In embodiments, the water-based fluids disclosed herein comprise compositions that act as a molecular "chisel" to detach hydrocarbons from surfaces in a hydrocarbon-bearing formation, and that concomitantly change the wettability of formation surfaces from oil-wet to water-wet. In non-homogenous wetting conditions, or mixed-wetting conditions, the compositions can increase the extent of water-wetting. In embodiments, the water-based fluids disclosed herein also comprise one or more surfactants that can reduce the interfacial tension (IFT) between crude oil and water. As used herein, the term "water-based fluid" includes aqueous solutions, dispersions, suspensions, and formulations that can be made into these forms by mixing with water. In embodiments, solvents can be used in dispersed or emulsified forms with the chisel formulations to disperse, soften or dissolve hydrocarbons.

In embodiments, the chisel compositions comprise polymers having two main constituents. One constituent (the "binding points" of the chisel) has one or more functionalities that display high affinity for the surface of the formation; the other constituent (the "hydrophilic segment" of the chisel) is hydrophilic, and can form a coating on the rock and/or protrude from the rock surface to make it hydrophilic. The chisel composition, comprising the binding points and one or more hydrophilic segments, can arrange itself in the reservoir formation by attaching itself to the reservoir rock at the binding points. The hydrophilic segment(s) will form a layer on the rock, creating a water-wet condition on its surface.

In one embodiment of a formulation for detaching hydrocarbons from surfaces in the formation, a chisel composition can work in synergy with a surfactant. The role of the surfactant in the formulation is to reduce the interfacial tension between the water and hydrocarbons to mobilize the oil that is coating the rock by "pulling" it from the rock surface. This can create a meniscus around the oil allowing the chisel formulation to enter in contact with the rock. The result is a change in the wettability of the rock, from oil to water wet. In this embodiment, the surfactant in the formulation can change the behavior of the oil on the rock so that there is an entry point for the chisel formulation beneath the oil itself. In embodiments, surfactants like those typically used in enhanced oil recovery (e.g., anionic surfactants like sulfates, sulfonates, alkyl ether sulfates, alkyl ether sulfonates, dodecylbenzene sulfonates, carboxylates, phosphates, phosphonates and the like, or nonionic surfactants like alkylphenyl, alkoxylates, alkyl alkoxylates, EO/PO copolymers and the like) can be advantageously used together with the chisel formulations to enhance the activity and the efficacy of the chisel formulation. In embodiments, the chisel compositions can be used without a surfactant. In embodiments, the chisel compositions can be used with additives to increase the viscosity of the chisel composition. Examples of the viscosity-increasing additives include guar, hydroxyethylcellulose, hydroxypropylcellulose, polyacrylamide, anionic polyacrylamide, cationic polyacrylamide, polyethylene oxide, hydrophobically associating swellable emulsions, viscoelastic surfactants, and the like.

In embodiments, the chisel compositions can be used with other additives in treating a surface, for example, in combination with an acid as a component of an acidizing treatment. In embodiments, chisel formulations can optionally include chelating agents for binding divalent cations or other chemicals in the reservoir. The water found in hydrocarbon reservoirs often contains divalent cations like $Ca^{++}$ and $Mg^{++}$. These materials could attach to the binding points of the chisel, preventing the chisel from attaching effectively to the cationic surface of the reservoir. In order to prevent the depletion of the chisel's binding capacity by these free ions, small molecules having cationic binding capacities could be added to the formulation to scavenge the divalent cations. Such materials are known in the art as chelating agents, chelants or sequestrants. Examples of such materials include citric acid, phosphoric acid, glycolic acid, tartaric acid, oxalic acid, EDTA, and the like. In embodiments, a water preflush can be used before the chisel treatment to displace soluble ions like $Ca^{++}$ and $Mg^{++}$ from the water surrounding the rock surfaces to be treated by the chisel, and/or to displace the connate water in order to reduce the concentration of dissolved hardness ions in the formation. In embodiments, other treatments, such as acid treatments, can be used in addition to or prior to the use of the chisel formulation. In embodiments, the chisel formulations can optionally include lignosulfonates, wettability enhancers such as fluorochemicals, and/or nanoparticles. In embodiments, the chisel formulations can optionally include additives such as dispersants, antiscalants, antifoulants, and/or crystal modifiers. The addition of a polyphosphoric-acid-containing formulation to a fluid containing dissolved calcium, or to a fluid that contacts solid calcium compounds or minerals, can cause precipitation of solids such as calcium phosphate salts. In embodiments, the addition of additives such as dispersants, antiscalants, or crystal modifiers can alter, delay, or prevent the formation of insoluble salts in such a way that it prevents blocking of the fluid paths in the reservoir. In embodiments, additives like dispersants, antiscalants, and crystal modifiers can comprise one or more of agents such as polyacrylic acid, polysodium acrylate, polyacrylate/phosphonate blends, polysaccharides, and dextran. In embodiments, the chisel formulations can optionally include additives such as paraffin inhibitors. Paraffins are linear or branched components of many crude hydrocarbons that can precipitate during production, leading to deposits and plugging of equipment, and handling problems due to elevated viscosity of the crude oil. Paraffin inhibitors are known in the art as additives that inhibit the formation of wax deposits by lowering the pour point, lowering the cloud point, interrupting the formation of wax crystals, or preventing the adhesion of wax to surfaces.

Chisel compositions can contain compounds designed to reduce their freezing point. These compounds can include glycols, alcohols (such as methanol, ethanol, isopropanol), and salts such as sodium chloride or potassium chloride.

Chisel compositions can also be combined with d-limonene emulsions, either in the non-aqueous chisel concentrate itself or in the aqueous solution. In this case, the d-limonene emulsion helps to remove oil from the surface of the carbonate while the chisel continues to modify the surface into becoming more hydrophilic.

Chisel compositions can also be combined with non-emulsifiers to prevent the formation of undesired emulsions. This allows the use of some additives that have some tendency to form emulsions, without adversely affecting production.

For use in treating hydrocarbon formations, the water-based formulations disclosed herein could be applied to the formation using techniques that are consistent with techniques used in the industry. In embodiments, the formulations and methods disclosed herein can be adapted for treating carbonate reservoirs. For the purpose of the invention, the term, "carbonate reservoir" includes calcium carbonates, limestones, dolomites, coral reef complexes, and shale deposits that comprise carbonates. For example, some shales contain from about 10 percent to about 70 percent carbonate. For carbonate reservoirs, the binding points of the chisel can comprise functionalities that display an affinity for $CaCO_3$. For example, binding point functionalities can include carboxylic acids, phosphonates, phosphates, biphosphonates, sulfonates, sulfates, chlorophenols, quinoline oxides, and the like. In other embodiments, the formulations and methods disclosed herein can be adapted for treating sandstone reservoirs. For such reservoirs, the binding points of the chisel can comprise functionalities that display strong interactions with silica. Examples include silanes and cationic compounds such as surfactants and polymers containing ammonium or phosphonium groups. In other embodiments, the formulations and methods disclosed herein can be adapted for treating shale type reservoirs. For such reservoirs, the binding points of the chisel can comprise functionalities that display strong interactions with shale components such as carbonates and clays. Examples include cationic compounds such as surfactants and polymers containing ammonium or phosphonium groups.

In embodiments, the formulations and methods disclosed herein can be adapted for the treatment of other surfaces as well, where removing asphaltene deposits and providing a water-wet state would be desirable. For example, steel surfaces in oil well drilling and storage may be fouled with asphaltene so that they are oil-wet; advantageously, a chisel formulation designed for cleaning such a surface would have strong interactions with steel. In embodiments, the steel surfaces to be cleaned by a chisel formulation can include storage vessels, separator vessels, pipelines, valves, and the like.

In embodiments, chisel compositions for carbonate formulations can comprise oligomeric or polymeric structures. As used herein, the term "polymer" means the polymerization product of one or more monomers and is inclusive of homo-, co-, ter-, tetra-polymers, etc. and oligomeric polymers; "mer" or "mer unit" means that portion of a polymer derived from a single reactant molecule; "copolymer" means a polymer that includes mer units derived from two reactants (normally monomers) and is inclusive of random, block, segmented, graft, etc., copolymers; "oligomer" is a short-chain polymer. In embodiments, these polymeric structures can be functionalized, having one or more functional groups covalently linked thereto. In embodiments, chisel compositions can include structures having polymers functionalized at the end of the polymer chain, or polymers having multiple functionalizations along the polymer backbone.

For synthesis of polymer chains with end-functionalization, starting materials can include water-soluble polymers with functional groups at the end of the polymer chains that can be chemically modified to yield calcium-binding (calcium chelating) functionalities. Examples of starting polymers with a functional group at one end include: alkoxy-PEGs (Carbowax MPEGs from Dow Chemical), and Jeffamines (M-1000, M2070 from Hunstman Chemical). Examples of starting polymers with two functionalization groups, one at each end include: polyethylene glycols (PEGs) (Carbowax PEGs from Dow Chemical), Jeffamines (Jeffamines include, for example, ED-600, ED-2003 form Hunstman Chemical), polyphosphoric acid, PEG-PPG block copolymers (Pluronics from BASF), and PEG diglycidyl ether. Such materials can be functionalized to yield a polymer having, for example, one of the following functionalities at the end of the polymer chain: phosphates, phosphonates, biphosphonates, chlorophenols, polyols, polyamines, hydrophilic segments, ethylene oxide segments, propylene oxide segments, quinoline oxides, o-benzene dicarboxylic acid, 1,2,3-benzene tricarboxylic acids, and the like.

For synthesis of polymers having multiple functionalizations along the polymer backbone, starting materials can include polymers with one or more functional groups along the backbone that can be chemically modified to result in a polymer with several calcium chelating functionalities. Starting polymers used for this modification can include: polyvinyl alcohol, styrene maleic anhydride resins (Sartomer), Joncryl polymers (BASF), polyethyleneimine, polyacrylic acid, polymethacrylic acid, polyphosphoric acid, lignin, and the like. Functional groups on the polymer backbone can include o-benzene dicarboxylic acid, 1,2,3-benzene tricarboxylic acid, phosphates, biphosphonates, chlorophenols, quinoline oxides, and the like.

In embodiments, chisel molecules can be synthesized that have boronic acid functionality, represented by the following chemical structure:

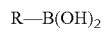

where R is selected from the group consisting of a polymer, wherein the boronic acid group is bonded directly or indirectly to the polymer backbone, or is a moiety for directly or indirectly functionalizing polymeric chains as described as $R—B(OH)_2$.

Boronic acid functionality can provide chelant properties, and has the additional benefit of stability at high temperatures, making its use appropriate for reservoirs with high bottom hole temperature. In embodiments, a boronic acid functionality can be introduced in a polyethylene glycol chain by coupling a poly(ethylene glycol) monocarboxymethylether, monomethyl ether polymer with 3-aminophenylboronic acid, using carbodiimide as the coupling agent. Another set of functional groups having properties similar to boronic acid and that can be used according to the instant invention are the monoesters of boric acid. Chisels containing such functional groups can be used in reservoirs with lower bottom hole temperatures, for example, below 60° C.

In other embodiments, phosphonic acid functionality can be added to the chisel formulation. This can add stability in the presence of high bottom hole temperatures. This functional group can be added to a chisel composition by coupling a poly(ethylene glycol) monocarboxymethylether, monoethyl ether polymer with 3-aminopropyl phosphonic acid using carbodiimide as the coupling agent. In another embodiment, the phosphonic acid functionality can be added to a polyethylene glycol by reacting a PEG-based Jeffamine with dimethyl(carboxymethyl)phosphonate using dicyclohexylcarbodiimide as the coupling agent, then treating the product with HBr-acetic acid to yield the free phosphonic acid group.

In other embodiments, amidophosphoric acid functionality can be added, again yielding chisel formulations that are likely to be relatively stable at high temperatures. This group may be introduced by reacting a water soluble Jeffamine with diethylchlorophosphate to form the amidophosphate, then hydrolyzing the product to yield the amidophosphoric acid.

In other embodiments, catechol functionality can be added to the chisel formulation. It is understood that catecholic hydroxyl groups display stronger acidic properties than many other hydroxyl groups, so that they are good chelants to metal oxides, especially when they are in a deprotonated form. Catechol derivatives of polyethylene glycols can be advantageously used for synthesizing chisel formulations.

2. Polyphosphoric Acid Chisel Compositions and Methods

Disclosed herein, in embodiments, are methods for improving oil recovery by treating the oil-bearing formation with a chisel composition comprising polyphosphoric acid oligomers or polymers and salts thereof (collectively, "PPA"). In embodiments, the PPA compositions include the salts or esters of polymeric oxyanions containing tetrahedral phosphate structural units linked together with oxygen atoms. In embodiments, these methods can be extended to PPA-containing compositions in aqueous solutions (for example, for enhanced oil recovery, waterfloods, steamfloods, workover treatments, squeeze treatments, acidizing, acid fracturing, and the like) or in organic solutions like diesel oil, mineral oil, xylene, toluene, and the like (e.g., for recovering damaged wellbores by cleaning the wellbore).

In embodiments, the polymeric or oligomeric form of PPA can be protected with a protective mechanism to prolong its effectiveness to increase the production of hydrocarbons from a formation. As an example, a protective mechanism can include a mechanism like encapsulating the PPA, trapping the PPA in a matrix, masking the PPA with a masking agent, exposing the PPA to a non-hydrolyzing diluent, and the like. The aim of the protective mechanism is to protect the PPA from environmental conditions up to the time when the acid is needed. A PPA that has been protected with a protective mechanism can be called "protected PPA." Methods for oil recovery utilizing PPA include, in embodiments, methods for delaying the hydrolysis of PPA in aqueous environments, and methods for effecting the controlled release of PPA by various triggering mechanisms.

The method for delaying the hydrolysis of PPA in aqueous environments can include encapsulation/trapping of PPA in a polymer matrix, protecting the acid groups of the PPA with compounds such as urea or polycationic compounds, protecting the PPA by emulsification with surfactants, or using a non-hydrolyzing diluent for the PPA (each of these mechanisms exemplifying a "protective mechanism" that forms protected PPA). As an example, methods for reducing the viscosity and delaying the hydrolysis of PPA can include the use of a non-hydrolyzing diluent for PPA. Non-hydrolyzing diluents for PPA include oil based carrier fluids, glycolic acid, acetic acid, glycols, polyglycols, polyethylene glycols, and glycol ethers. In embodiments, the formulation of a low viscosity (<1000 cP) fluid containing PPA that resists hydrolysis is accomplished by blending PPA with an effective amount of acetic acid. This solution is easier to handle and pump than the viscous concentrated PPA liquid. Surfactants and other additives can be blended into the mixture of PPA and acetic acid.

The method of controlling the release of PPA by various triggering mechanisms can be used, for example, for a PPA-containing composition that is stable under one condition and is triggered to release the PPA by a change in that condition. The conditions whose changes trigger the release of PPA can include temperature, dissolution, pH, etc. The controlled release process can be used for applications such as recovering oil from a formation, restoring a damaged formation by changing the wettability of its surface, and the like.

In embodiments, the water-based formulations disclosed herein can comprise PPA or protected-PPA containing compositions that act as a "chisel" to detach hydrocarbons from surfaces in the formation, and that concomitantly changes the wettability of the formation from oil-wet to water-wet. In embodiments, the water-based formulations disclosed herein can also comprise one or more surfactants that can reduce the interfacial tension (IFT) between crude oil and water. In embodiments, solvents can be used with the chisel formulations to disperse, soften or dissolve hydrocarbons.

Without being bound by theory, the PPA (i.e., the polyphosphoric acid polymers or oligomers) can act as a strong acid and can have high affinity for the surface of the formation due to its plurality of phosphate groups: the multiple anionic groups can allow the PPA to bind to the rock via multiple points, making the rock hydrophilic due to the presence of free ionic groups and presence of multiple P=O polar groups. The result is a water-wet condition on the surface of the formation. PPA is an advantageous chisel material because it has dual properties as an acid and polymer. For the compositions and methods disclosed herein, PPA can be an oligomer of orthophosphoric acid, but having higher acidity than orthophosphoric acid. Its acidity increases as the number of polyphosphoric acid units increase in the PPA polymer due to the ability of the longer chain PPA to stabilize multiple negative charges by resonance.

In embodiments the PPA can be used in an acid fracturing composition where the polyphosphoric acid is released slowly, for example by controlled release, allowing for the acid to treat sections of the formation further away from the wellbore. In embodiments the controlled release mechanism is actuated by a trigger mechanism such as a change in the temperature of the formation deeper underground, the addition of pH modifiers to the formulation, the diffusion of the fluid of the formation into protected PPA, the dissolution of the protective mechanism of the protected PPA so that the PPA can diffuse into the fluid of the formation, and the like.

In embodiments, PPA, as used for the compositions, formulations and methods described herein, has a degree of polymerization from about 2 to about 20 phosphorous repeating units arranged in a linear, branched, or cyclized structure. In embodiments, the PPA is employed in the acidic form. In embodiments, the PPA is a neutralized anionic salt form, with counterions such as alkali metals, ammonium ion, ammonium salts, alkanolammonium salts, and the like. Exemplary PPA neutralized salt forms include ammonium polyphosphate, sodium polyphosphate, potassium polyphosphate, sodium tripolyphosphate, sodium hexametaphosphate, sodium trimetaphosphate, superphosphate, and the like. In embodiments, the PPA based chisel formulation further comprises chelating agents, acids, surfactants, and/or solvents. In embodiments, the PPA chisel formulation can be delivered as a controlled release form, wherein the PPA and any other agents within the formulation are released in a controlled manner.

As described below, it has been demonstrated that PPA can etch a carbonate rock and adsorb onto the rock, providing a more hydrophilic surface and resulting in a change of its wettability from oil-wet to water-wet. This phenomenon does not take place, though, when a carbonate rock is exposed to monomeric phosphoric acid, demonstrating the difference between PPA and the simple phosphoric acid monomer. PPA loses certain of these advantageous properties when dissolved in water for an extended period of time, because it hydrolyzes to monomeric orthophosphoric acid.

In embodiments, the PPA can be protected with a protective mechanism so that it maintains these useful properties. For example, PPA can be encapsulated so that its functionalities are protected, allowing it to act more efficiently as a molecular chisel to remove oil from surfaces and improve oil and gas recovery from subterranean reservoirs. Commonly used encapsulating techniques can compromise the stability of the PPA, however, and encapsulation can be difficult to accomplish due to a variety of factors, including to the relatively fast hydrolysis of the acid in protic solvent, low or negligible solubility in non-protic solvents and, high viscosity. Disclosed herein in embodiments are methods for encapsulating PPA to protect it against hydrolysis and consumption near its injection point.

In embodiments, PPA can be protected by entrapping, embedding or otherwise encapsulating it in a polymeric matrix. For example, PPA composites can be formed comprising a core-shell structure in which the PPA is in the core, and the shell is an encapsulating polymer. In embodiments, the PPA can be encapsulated within or commingled with a polymeric matrix. The polymeric matrix can be selected to allow for a controlled release of the PPA, with the matrix being selected according to the salient characteristics of the wellbore (its temperature, the distance that the acid needs to penetrate into the formation, the presence and nature of carrier fluid (e.g., drilling fluid, completion fluid, formation water) and the like).

As an example, encapsulated PPA compositions can be formed as follows. Minimum amounts of a volatile solvent are added to the PPA to yield solutions concentrated in PPA but with lower viscosity than pure PPA. The solvent is selected so that it does not hydrolyze the PPA to a significant degree. This PPA solution is then added to a solution of encapsulating polymer in an organic solvent. In embodiments, the PPA solution can be formed to be miscible with the encapsulating polymer solution; in other embodiments, the PPA solution can be suspended or emulsified in the polymer solution. The solution or emulsion containing the combination of PPA and encapsulating polymer can then be manipulated to yield encapsulated PPA. For example, spray drying of the mixture can yield the encapsulated PPA. Or, for example, encapsulated PPA composite can be obtained by precipitating the polymer-PPA mixture by combining this mixture with another agent that acts as a non-solvent for the polymer. As another example, encapsulated PPA composites can be formed using a dry process. In embodiments, the encapsulating polymer can be a wax, or oil, an olefin co-polymer, a fatty acids, or the like, or blends thereof. Using wax, for example, the encapsulating wax melts and mixes with the PPA under high shear conditions to form a uniform mixture that can then be broken down into small particles. In embodiments, encapsulating methods can be used that are analogous to those employed in the pharmaceutical industry, with modifications as needed to avoid the long contact of PPA with protic solvents.

In embodiments, an encapsulated or otherwise protected PPA can be produced that is responsive to various triggering mechanisms that can effect a controlled release of the PPA from its protected state. Desirably, a triggering mechanism can be selected, whereby a change in a condition permits the release of the PPA from its protective mechanism. In embodiments, encapsulation materials or matrix materials can be selected that permit the controlled release of PPA from its protected state when a specific triggering mechanism or condition is encountered (e.g., temperature, time, pressure, pH). Protective mechanisms can be selected so that the protected PPA relying upon the specific protective mechanism is responsive to a predetermined triggering mechanism, thereby allowing the PPA to be released in a controlled manner. As an example, dissolution of a matrix or of an encapsulation can be engineered to allow the controlled release of PPA. Using this mechanism, PPA that is entrapped/encapsulated in a matrix can be released in a controlled manner as the matrix slowly dissolves over time. With this mechanism, the controlled release of PPA can be adjusted by controlling the dissolution rate of the matrix. Examples of encapsulants for entrapping PPA and permitting its controlled release in aqueous media include: polyethylene glycol, polyvinyl alcohol, polyvinyl pyrrolidone and its copolymers, and the like. Examples of encapsulants for entrapping PPA and permitting its controlled release in organic media include: wax, oil such as palm oil, hydrophobic polymers, co-polymers, and the like.

As another mechanism for the controlled release of PPA, diffusion can be employed. Using this mechanism, the PPA can be encapsulated in a material like a glassy hydrogel that can slowly swell in the water phase, permitting the controlled release of the PPA. Examples of materials suitable for use with this mechanism include hydrophilic gums (guar gum), xanthan gum, hydroxypropyl methylcellulose (HPMC), carboxy methyl cellulose (CMC), polyacrylamides, ammonioalkyl methacrylate copolymers such as the Eudragil RL, RS series available from Evonik, and the like.

As another mechanism for the controlled release of PPA, the pH can be changed. Using this mechanism, the selected encapsulation material can be responsive to changes in pH so that it that allows the PPA to be released in a controlled manner under certain pH conditions. Examples of suitable encapsulation materials include ionic coating polymers that become more soluble in a solvent upon changing the pH, thereby allowing the PPA to be released. Examples of coating polymers that respond to changes in pH in this way are the Eudragit L, S FS, E series by Evonik, cellulose acetophthalate, Shellac, and the like.

As another mechanism for the controlled release of PPA, the temperature of an encapsulation material surrounding the PPA or a matrix material supporting the PPA can be changed, allowing the PPA to be released in a controlled manner. Examples of suitable materials that respond to temperature in this way are glycerides (totally or partially acetylated), Witepsol, Imwitor family by Sasol, wax or other hydrophobic polymers that has the appropriate melting temperature. These materials can melt at certain selected temperature, for example, releasing the PPA.

Another mechanism for protecting PPA and allowing for its release on a controlled basis involves masking PPA with a masking agent and then unmasking it. The masking agent acts as a protective mechanism to protect the PPA. In embodiments, for example, the PPA can be protected by adding ionic groups that mask the PPA groups. These protecting groups hinder or delay the hydrolysis of the PPA. Materials for masking agents can include urea, polycations, and the like. The polycations can be selected for their hydrophilicity and cationic charges. In embodiments, the polymers can be naturally derived, for example, proteins and glucosamines. Polymers used for these purposes can be applied as coating polymers. For preparing protected PPA in this manner, PPA and the protective material (e.g., the masking agent, such as a cationic substance) can be first placed in an aqueous solution, with subsequent addition of a water-miscible and non-solvent for the cationic polymer. In other embodiments, protected PPA can be prepared with a masking agent by placing the PPA and the masking agent (e.g., the cationic substance) in an aqueous solution and increasing the pH to precipitate the masking agent. Examples of polycations suitable for use as masking agents include SMAi (imidized styrene maleic anhydride), zein, casein, or any of a number of polyamines (such as polyvinylamine, polyallylamine, polyethyleneimine) and their derivatives (such as PEGylated varieties), poly-DADMAC, chitosan, and cationic proteins or glycoproteins. In embodiments the masking agents can have a switchable solubility profile, as a function, for example, of pH, temperature or ionic strength, to facility the release of the PPA. In such an embodiment, the change in pH, temperature, ionic strength or the like functions as a triggering mechanism to actuate the controlled release of the PPA.

Another type of PPA masking involves the use of emulsification of PPA in combination with a surfactant. According to this mechanism, PPA is mixed with a solution containing a surfactant, which is then added to a hydrophobic solvent to form an emulsion of the PPA in the organic solvent. The shielding of the PPA by the emulsifier layer delays the consumption and/or hydrolysis of the PPA. In an embodiment, the surfactant is cationic and forms strong ion pair compounds with the PPA. Upon mixing the surfactant with the PPA in a common solvent, the ion pair is formed. Then addition of the complex to a hydrophobic solvent results in the lipophilic portion of the surfactant extending into the hydrophobic solvent phase and stabilizing the PPA-containing droplets. Examples of these surfactants are: Decyl trimethyl ammonium bromide, Dodecyl trimethyl ammonium bromide, Dodecyl triphenyl phosphonium bromide, Arquad C-50, Arquad T-50, benzethonium chloride, benzalkonium chloride, Adogen 464.

In other embodiments the surfactant can be a non-ionic with a low HLB value. Similar to the above case, when the surfactant and the PPA are mixed in a common solvent, the hydrophilic portion of the surfactant interacts with the PPA, which is hydrophilic. Then addition of the complex to a hydrophobic solvent results in the lipophilic portion of the surfactant extending into the hydrophobic solvent phase and stabilizing the PPA-containing droplets. Examples of these surfactants are: sorbitan monooleate (Span 80), sorbitan monostearate (Span 60), nonyl phenol ethoxylated such as CO-210 from Rhodia, octylphenol ethoxylated such as Triton X-15 form Dow, etc. The PPA protected by this method is in the form of a water in oil emulsion, and the PPA can be released into an aqueous system when needed by adding to the emulsion a solution containing hydrophilic surfactant that breaks the water in oil (W/O) emulsion.

3. Exemplary Applications for Molecular Chisel Technology

In embodiments, the formulations disclosed herein can be used for increasing oil and gas recovery from a reservoir. In embodiments, such formulations can be used for increasing oil recovery from a mature reservoir in a carbonate formation. For mature reservoirs, the recovery of oil by injecting aqueous fluids (i.e., enhanced oil recovery or EOR) is typically inefficient, in part because the injection fluid cannot penetrate the pores of the formation due to their oil-wet conditions. The formulations and methods disclosed herein offer approaches to improving oil recovery efficiency by removing asphaltene deposits and changing the oil-wet state of the oil-bearing rock to a more water-wet state.

In other embodiments, the formulations disclosed herein can be used for removing oily deposits from near-wellbore reservoirs and preventing or remediating near wellbore damage. It is understood in the art that the trajectory of a near-wellbore reservoir is complex and tortuous. Ledges and cavities exist in these regions that tend to collect fluid that has contacted them. Fluids so collected can include wellbore oil, asphaltenes, resins, waxes and other hydrocarbon materials from the well. These materials adhere to the surfaces of the passages within the near wellbore region and can plug the pores in the wellbore. These collections clog the passages, preventing oil flow and producing wellbore damage.

Use of the formulations disclosed herein can be combined with other components of a treatment mixture that can release unwanted hydrocarbon-based clogging materials from the rock surface in the near wellbore region. The chemical functionality of these formulations can interact strongly with the rock surface, resulting in a release of materials bound thereto, and ultimately enhancing the flow of oil. Due to the hydrophilic nature of these formulations, a water-wet condition will be produced on the rock surface, which can prevent the subsequent build-up of oil, waxes, asphaltenes and other oleophilic materials.

In yet other embodiments, the formulations disclosed herein can be used as part of a frac fluid treatment system. These formulations, which are soluble or dispersible in the frac fluid, can be carried by the flow of the frac fluid into the reservoir, where they can perform three desirable processes: 1) introducing cracks in the reservoir to facilitate the flow of oil, 2) releasing oil from rock surfaces, and 3) coating the surface of the formation rock with a composition that leaves the formation in a water-wet state that can prevent subsequent deposition of asphaltenes thereupon. In embodiments, these three processes can take place approximately simultaneously.

In other embodiments, the formulations disclosed herein can be used for removing or preventing deposits in crude oil processing or transporting equipment, such as pipelines, storage vessels, separator vessels, valves, and the like. In embodiments, the formulations disclosed herein can be used for removing or preventing asphaltene deposits and/or paraffin deposits in crude oil processing or transporting equipment. In embodiments, the formulations can be added by periodic treatment, such as squeeze treatment, or by continuous treatment into the oil-containing stream to prevent the formation of deposits in petroleum reservoirs, transporting equipment, or processing equipment.

In embodiments, formulations and methods are disclosed herein for increasing oil recovery from a reservoir, particularly a mature reservoir in a carbonate formation. For mature reservoirs, the recovery of oil by injecting aqueous fluids (i.e., enhanced oil recovery or EOR) is typically inefficient, in part because the injection fluid cannot penetrate the pores of the formation due to their oil-wet conditions. The formulations and methods disclosed herein offer approaches to improving oil recovery efficiency by removing asphaltene deposits and changing the oil-wet state of the oil-bearing rock to a water-wet state.

One method for detaching hydrocarbons from surfaces in the formation using the disclosed formulations involves synergistically employing a chisel composition with a surfactant. The role of the surfactant is to reduce the interfacial tension between the water and hydrocarbons to mobilize the oil that is coating the rock by "pulling" it from the rock surface. This will create a meniscus around the oil allowing the chisel formulation to enter in contact with the rock, changing its wettability from oil-wet to water-wet. In this method, the surfactant formulation changes the behavior of the oil on the rock so that there is an entry point for the chisel formulation beneath the oil itself. In embodiments, surfactants like those typically used in enhanced oil recovery (e.g., anionic surfactants like sulfates, sulfonates and the like, or nonionic surfactants like alkylphenyl, alkoxylates, alkyl alkoxylates, and the like) can be advantageously used together with the chisel formulations to enhance the activity and the efficacy of the chisel formulation. In embodiments, tunable or switchable surfactants can be used together with the chisel formulations.

In embodiments, the formulations, compositions and methods disclosed herein can provide for enhanced oil recovery from underground reservoirs, resulting in increased oil production and/or decreased water cut. In embodiments, the formulations, compositions and methods disclosed herein can provide for reservoir stimulation, for example for new well completions, workover of existing wells, as adjunct to acidizing methods, and the like. In embodiments, the formulations, compositions and methods disclosed herein can provide for repair of near wellbore damage, for example by removing oil residua such as asphaltenes and/or paraffins and/or waxes, or by improving permeability in the near wellbore region, resulting in improved flow of oil, water, natural gas and condensates. Other uses for the formulations, compositions and methods can be envisioned. The chisel technologies disclosed herein can be used alone or in combination with other technologies familiar in the oil and gas industry, including the use of surfactants (including tunable surfactants), solvents (e.g., diesel, naphtha, mineral oil, hexane, pentane, heptane, xylene, d-limonene and the like) or emulsions thereof, acids, chelants, polymer rheology modifiers, water shutoff chemicals, microparticles or nanoparticles, or the like. The chisel technologies disclosed herein can be used alone or in combination with foam application methods familiar in the oil and gas industry. A foam formulation comprising the chisel technology can be prepared by combining a foam former, such as gaseous nitrogen, carbon dioxide, air, hydrocarbons, or the like, with the chisel technology. In embodiments, the chisel technologies can be used for the extraction of oil, heavy oil or bitumen from mineral deposits, as is seen for example in oil sands extraction, whether by mining processes or by in-situ thermal or steam processes. In embodiments, the chisel technologies can be used to pretreat or precondition a petroleum bearing reservoir to improve subsequent production; examples of this include pretreatment of bitumen containing oil sands in preparation for steam assisted gravity drainage (SAGD) recovery operations. In embodiments, the chisel technologies can be used for the cleaning of metal surfaces, as are found in oil and gas production equipment, pipes, transport lines and the like. In further embodiments, the chisel technologies can be used to pretreat metal surfaces, such as pipes and tanks, to prevent their subsequent corrosion or fouling with deposits.

EXAMPLES

Materials: All the materials were obtained from Aldrich unless otherwise specified.

Polyphosphoric acid, PPA, (Aldrich, product number 208213) was 115%, expressed as H3PO4 equivalent.

The "oil-wet $CaCO_3$ particles" described below consisted of Calcium carbonate particles (VICAL® 1000 A-9-296-11) from Specialty Minerals Inc. (Adams, Mass.) that were soaked with heavy oil (API12°) and aged in an oven at 70° C. for 1 day.

Aragonite Sand (CaribSea, Fort Pierce, Fla.)

Polyphosphoric Acid—115% (Sigma-Aldrich, St. Louis, Mo.)

Sodium Tripolyphosphate—85% (Sigma-Aldrich, St. Louis, Mo.)

Sodium Hexametaphosphate (Humboldt Manufacturing Co., Schiller Park, Ill.)

n-Decane (TCI America, Portland, Oreg.)

Example 1: Synthesis of Polyethylene Glycol Phosphate

A 50 ml round bottom flask was charged with polyethylene glycol monomethyl ether, Mn~550 (11 g, 0.02 mol) and Polyphosphoric acid, 115% $H_3PO_4$ equivalent (1.7 g, 0.02 mol). The mixture was stirred under nitrogen at 100° C. for 2 hours. The product was used without further purification.

Example 2: Synthesis of Polyvinyl Alcohol Modified with Phosphoric Acid

To a round bottom flask attached to a condenser, 10 ml. of phosphoric acid (35%, Aldrich) was added and heated to 110° C. Following this, 8 g of urea (Aldrich) and 2 g of Polyvinyl alcohol (88% hydrolyzed, 160,000 molecular weight, Aldrich) was added to the phosphoric acid solution while stirring. The reaction was continued for 2 hours at 110° C. Then 80 ml of DI-water was added while stirring the mixture vigorously. The product was purified by precipitating over approximately 350 ml. acetone. The precipitated solid was recovered by filtration and dried in the vacuum oven at 75° C. until constant weight was attained.

Example 3: Synthesis of Lignin Modified with Phosphoric Acid 9.6 gm of water, 1.75 ml. of phosphoric acid (35%, Aldrich) and 7.4 gm urea were mixed in a beaker and stirred with a magnetic bar while the temperature was increased to 80° C. Next, 2 gm of lignin (MeadWestvaco, Va.) was added and the mixture was stirred further for 30 min. The solids were recovered from the mixture by filtration and heated in an oven for 150° C. for 1 hour.

Example 4: Treatment of Oil-Soaked Calcite ($CaCO_3$)

A series of experiments was performed to evaluate the ability of various aqueous formulations to remove a coating of aged crude oil from a calcite ($CaCO_3$) crystal. A heavy crude oil (API 12°, Viscosity 7,000 cps at 25° C.) was used for the experiments, having a relatively high viscosity and low API, so that it simulated a typical hydrocarbon found in a mature reservoir. Calcite crystals (Iceland Spar from WARD'S Natural Science, Rochester, N.Y.) were soaked for 2 days at 80° C. in this heavy crude oil. After the 2 days, the calcite crystals were removed from the crude oil and the excess oil allowed to drain off. Subsequently, the oil-soaked crystals were placed into a 20 ml vial containing approximately 10 g of the aqueous test solutions, the composition of which is set forth in Table 1. The chisels in each of the test solutions were synthesized according to the procedures described in the previous examples, as indicated in the tables below. In all the solutions, the pH was adjusted to pH7.

TABLE 1

Test Solutions

| Experiment # | Chisel Description | % Surfactant Triton X-114 (Aldrich) | % Chisel | % DI Water |
|---|---|---|---|---|
| 4.1 | — | 0 | 0 | 100 |
| 4.2 | — | 0.5 | 0 | 99.5 |
| 4.3 | Example 1 | 0.5 | 0.5 | 99.0 |
| 4.4 | Example 2 | 0.5 | 0.5 | 99.0 |
| 4.5 | Polyacrylic acid (Mn~450,000) From Aldrich | 0.5 | 0.5 | 99.0 |

The samples were allowed to soak and their appearance was monitored over time.

Table 2 displays the estimated percentage of remaining oil on the calcite crystal samples over time. The numbers were estimated from the area of the calcite that remains coated with the oil vs. the area that is clean.

TABLE 2

Percentage of oil on calcite samples at different times

| Experiment # | 2 hours | 5 hours | 24 hours |
|---|---|---|---|
| 4.1 | 100 | 98 | 95 |
| 4.2 | 100 | 100 | 98 |
| 4.3 | 50 | 25 | 1 |
| 4.4 | 50 | 20 | 1 |
| 4.5 | 90 | 80 | 5 |

These experiments also estimated the contact angle of oil drops on the surface of the treated crystals once the majority of the oil had been removed by the treating solutions. For samples 3, 4 and 5, the estimated contact angle is very high (>135°) indicating that the oil does not wet the calcite surface, in other words, that the calcite surface is water-wet. For samples 1 and 2 the contact angle is small (<5°), indicating that the oil is spreading over the surface of the crystal, consistent with an oil-wet surface.

Example 5: Removal of Crude Oil from Calcite Using Chisel and Surfactant

The protocol set forth in Example 4 was employed to show that small concentrations of the chisel formulation in conjunction with a surfactant are able to remove aged crude oil that coats a calcite crystal. For each of the tests listed in Table 3, the chisel formulation was the one described in Example 1.

TABLE 3

Test solutions

| Experiment # | % Surfactant Triton X-114 (Aldrich) | % Chisel (Example 1) | % DI Water |
|---|---|---|---|
| 5.1 | 0.5 | 0.5 | 99.00 |
| 5.2 | 0.5 | 0.25 | 99.25 |
| 5.3 | 0.5 | 0.1 | 99.40 |
| 5.4 | 0.5 | 0.01 | 99.49 |

Table 4 displays the estimated percentage of remaining oil on the calcite samples over time. The numbers were estimated from the area of the calcite that remains coated with the oil vs. the area that is clean.

TABLE 4

Percentage of oil on calcite samples at different times

| Experiment # | 2 hours | 5 hours | 24 hours | 7 days |
|---|---|---|---|---|
| 5.1 | 50 | 25 | 1 | 1 |
| 5.2 | 80 | 60 | 8 | 1 |
| 5.3 | 100 | 100 | 10 | 3 |
| 5.4 | 100 | 100 | 30 | 3 |

Example 6: Removal of Crude Oil from Rough-Surfaced Calcium Carbonate Rock

The protocol set forth in Example 4 was used to evaluate the ability of various aqueous formulations to remove oil from a porous calcium carbonate rock with a rough surface. Table 5 lists the aqueous solutions that were used in this Example.

TABLE 5

Test solutions

| Experiment # | Chisel Description | % Surfactant Triton X-114 (Aldrich) | % Chisel | % DI Water |
|---|---|---|---|---|
| 6.1 | — | 0 | 0 | 100 |
| 6.2 | — | 0.5 | 0 | 99.5 |
| 6.3 | Example 1 | 0.5 | 0.5 | 99.0 |
| 6.4 | Example 2 | 0.5 | 0.5 | 99.0 |
| 6.5 | Polyacrylic acid (Mn~450,000) From Aldrich | 0.5 | 0.5 | 99.0 |
| 6.6 | Example 3 | 0.5 | 0.5 | 99.0 |

Table 6 displays the estimated percentage of remaining oil on the calcite samples over time. The numbers were estimated from the area of the calcite that remains coated with the oil vs. the area that is clean.

TABLE 6

Percentage of oil on calcite samples at different times

| Experiment # | 16 hours | 21 hours | 3 days |
|---|---|---|---|
| 6.1 | 100 | 100 | 95 |
| 6.2 | 100 | 100 | 100 |
| 6.3 | 50 | 40 | 5 |
| 6.4 | 60 | 45 | 5 |
| 6.5 | 70 | 60 | 10 |
| 6.6 | 90 | 80 | 10 |

Example 7: Stability of PPA to Hydrolysis

Several titrations were carried out to evaluate the stability of PPA to hydrolysis at different temperatures and at different time periods.

A solution of 1 wt % of PPA in DI-water was prepared by dissolving 10 g of PPA in 1000 ml of DI-water. The solution was divided in 3 batches; one batch was left at room temperature, another batch was placed in the refrigerator at ~0° C., and the last batch was placed in an oven set at 50° C. Aliquots of the 3 batches (approximately 50 ml) were titrated at different times with a 1 M NaOH solution. This information is used to determine a degree of polymerization (DP) to show the size of the polymer repeating structure. PPA hydrolyzes in water, resulting in a lower DP after hydrolysis, eventually leading to ortho-phosphoric acid. Increasing temperature accelerates the hydrolysis as shown in Tables 7a and 7b.

TABLE 7a

Hydrolysis of PPA at different conditions

| Experiment # | Temperature (C.) | Initial DP | DP after 20 hrs |
|---|---|---|---|
| 7.1 | 20 | 4.3 | 3.2 |
| 7.2 | 50 | 4.3 | 2.0 |

TABLE 7b

Hydrolysis of PPA at different conditions

| Experiment # | Temperature (C.) | Percent hydrolysis after 20 hours |
|---|---|---|
| 7.3 | 5 | <10 |
| 7.4 | 20 | 35 |
| 7.5 | 50 | 100 |

Example 8: Encapsulation of PPA by Spray Drying and its Performance as Oil Recovery in Carbonate Formation A solution of PLURONIC® F127 from BASF (Florham Park, N.J., USA) in tetrahydrofuran was prepared by mixing 6.3 g of the PLURONIC® F127 and 30 g of tetrahydrofuran. In a separate vial it was mixed 0.72 g of PPA and 1.17 g of ethyl alcohol. The solution was stirred until both liquids were uniformity mixed. Next the PPA solution was added to the Pluronic solution, manually shaken for a few seconds until a homogeneous emulsion was formed and spray dried using a PREVAL® Spray system. After 30 minutes 1.6 g of PPA encapsulated particles were collected. Yield of the spray drying process was ~25%. Light microscopy was done, and encapsulated particles of 10-100 microns were observed. The particles were suspended in water, and titrations were done to demonstrate that the PPA was released into the solution.

Example 9: Characterization of Encapsulated PPA Particles

The spray dried polymer-encapsulated particles from Example 8 were characterized to evaluate the amount of PPA encapsulated in the particles and determine the degree of hydrolysis of the encapsulated PPA. To a beaker were added 0.092 g of the particles prepared in Example 8 and approximately 10 g of DI-water. The particles were stirred via a magnetic bar and titration of the solution with a 0.01M NaOH solution carried out at once. The 1st equivalent point at approximately 0.07 mmol of NaOH 0.01M indicated that the particles contain approximately a 4 wt % of PPA. The 2nd equivalent point at approximately 0.12 mmol of NaOH 0.01M indicates that the PPA has only been partially hydrolyzed during the encapsulation process leaving enough active PPA to be used in further applications.

Example 10: Transporting Polymer-Encapsulated PPA and its Controlled Release

This experiment shows how the encapsulated PPA can be transported to a desired location in a hydrophobic solvent and released when needed by addition of water. A possible application of this method is wellbore cleanout.

To a vial was added 0.0933 g of particles from Example 8 and 5 ml of hexane. The mixture was shaken to form a suspension of the particles in the hexane. The suspension was allowed to stir for 30 minutes. After that period of time, visual observation of the suspension did not show any changes, suggesting the acceptability of hexane as a non-reactive transport media. Next, 5 ml of DI-water was added to the suspension to form a two-phase mixture in which the polymer particles migrated to the aqueous phase and dissolved readily. The mixture was titrated against NaOH 0.01 M, showing the typical 2 equivalent points of PPA. The analysis of the equivalent points indicates that suspending the particles in hexane did not hydrolyze the PPA.

Example 10: Encapsulation of PPA by Spray Drying with a pH-Responsive Polymer

A solution of poly(vinylacetate-co-crotonic acid), acid number=62-70 (Aldrich, Product number 444677) was prepared by dissolving 10 g of the polymer in 30 g of tetrahydrofuran. In a separate vial was mixed 3.5664 g of PPA with 3.5 g of ethanol. The solution was stirred until both liquids were completely mixed. Next, the PPA solution was added to the polymer solution and manually shaken for a few seconds. The obtained emulsion was spray dried using a PREVAL® Spray system. After 30 minutes 0.6 g of polymer-encapsulated PPA particles were collected.

Example 12: Controlled Release of Polymer-Encapsulated PPA by pH Adjustment

This example shows the capability of the polymer encapsulated PPA to detach oil form a calcium carbonate surface.

0.22 g of particles from Example 11 were placed in a vial containing 5 ml of water and 1.5 g of "oil-wet $CaCO_3$ particles" (prepared as described in the Materials Section). The solution was left to stand at room temperature for a few days. Over time, the solution pH gradually increased, partially neutralizing the acid groups of the encapsulating polymer. As a result, the polymer particles became swollen, slowly releasing the PPA. The released PPA acted upon the surface of the $CaCO_3$ particles, completely removing the attached oil after about four days.

Example 13: Protecting PPA with Urea

This example shows how the hydrolysis of PPA can be retarded by protecting the acid groups with urea and, how the resulting urea-PPA complex maintains its oil-cleaning properties. To a beaker was added 250 ml of DI-water and 3.13 g of PPA (36.7 milliequivalents of H3PO4). To this solution was added 2.2 g of urea (36.7 mmol) and the mixture stirred until all the urea was dissolved. The solution was kept at room temperature, and aliquots were titrated at different times in order to evaluate the level of PPA hydrolysis. Results were compared to a control sample consisting of same amount of PPA in DI-water.

The results indicated that after aging for 24 hours, the control sample was partially hydrolyzed while the PPA-urea solution remained unhydrolyzed. After 2 days, both solutions showed partial hydrolysis of the PPA but in the control sample the level was higher. After 9 days the control samples was fully hydrolyzed while the urea-PPA complex only showed partial hydrolysis.

An experiment was also carried out to evaluate capability of urea-PPA solution to remove oil from a carbonate surface. To a vial was added 5 ml of the PPA-urea solution and 1.5 g of "oil-wet $CaCO_3$ particles". The solution was left at room temperature for a few days and the percentage of cleaned particles was estimated over time. The results indicated that after 4 days approximately 60% of the particles were cleaned from the oil layer. This finding is consistent with the cleaning efficiency of a control PPA solution, indicating that the presence of urea does not hinder the cleaning efficiency of PPA.

Example 14: PPA Encapsulation with Wax 10 gm of paraffin wax (Aldrich, m.p. 53-57° C.) can be dissolved in 90 g of hexane. A solution of 1 g of PPA in 2 g of ethanol can be added to the wax solution and the whole mixture can be immediately precipitated by adding dropwise to a 500 ml of methanol. The wax-encapsulated PPA can be recovered by vacuum filtration and dried in a vacuum oven at room temperature for 4 hours.

Example 15: Wax-Encapsulated PPA Release by Increase in Temperature

To demonstrate the release of PPA by temperature, the encapsulated PPA prepared according to Example 14 can be suspended in water and heated slowly. The release of PPA is monitored by measuring the pH of the solution. At the melting temperature for the wax coating, the PPA would be released into the water.

A parallel experiment can be carried out with the same parameters but with "oil-wet $CaCO_3$ particles" also immersed into the solution. The result would be that the oil is completely removed from the $CaCO_3$ particle surface due to its interaction with the released PPA.

Example 16: PPA Encapsulation with Chitosan

A 0.1% solution can be made by dissolving Chitosan in acidic water. PPA, 10 wt % based on the amount of chitosan, can be added to the chitosan solution with stirring; immediately afterwards, the pH of the solution is increased while stirring to enable the chitosan to precipitate upon the surface of the PPA, trapping the PPA. The solution is drained and the substrate dried overnight under vacuum at 40° C.

Example 17: PPA Encapsulation with Wax 10 gm of wax (Aldrich, m.p. 55° C.) and 1 g of PPA (Aldrich, 115% equivalent phosphoric acid) was placed in a plastic container. The container was then loaded into a high shear mixer such as the FlackTek DAC 150 FVZ-K (FlackTek, Landrum, S.C.). The mixture was shear mixed at ~2000 rpm for 10 minutes. The high shear melted the wax and formed a uniform mixture with the PPA. The mixture was then broken into small particles by using a blender.

Example 18: Spontaneous Imbibition Test

Spontaneous imbibition test was performed in standard Amott cells. The tested core samples were limestone from Texas (Edwards Plateau), with a porosity 29%, and a permeability 90-110 mD. The cores were approximately 1 inch in diameter and 1.5 inch in length. The cores were immersed in heavy oil (API12°) under vacuum to fully fill all the pores. The soaked samples was aged in an oven at 80° C. overnight. Next the oil-soaked cores were placed in a vertical position in an Amott cell and the cell filled with about 50 ml of the test solution. The cells were placed in an oven set at 50° C., and the amount of recovered oil over time was monitored. Three solutions were tested: Solution A: water solution containing 1 wt % of chisel material prepared in Example 1, 3 wt % NaCl and 1 wt % Tergitol 15-S-40; Solution B: water solution containing 1 wt % diethylenetriamine penta(methylene phosphonic acid), 3 wt % NaCl and 1 wt % Tergitol 15-S-40; Solution C: water solution containing 1 wt % commercial surfactant (branched alkyl propoxylated sulfate), 3 wt % NaCl and 1 wt % Tergitol 15-S-4.

Solution C released no oil from the core over 70 days soak time, while Solution B released 8% and Solution A released 51% of the total amount of oil from the core sample under static soaking conditions (i.e., with no mixing). These results demonstrate that the chisel compositions have the ability to displace significant amounts of oil from the surfaces of geologic samples.

Example 19: Effect of PPA Hydrolysis at 20° C.

To determine the effect of PPA hydrolysis on chisel performance, a solution of 1% PPA in water was prepared and held at 20° C. for 1 day. The aged 1% PPA solution was compared with a freshly prepared 1% PPA solution in oil removal tests. For these tests, oil coated calcium carbonate samples were soaked in the PPA solutions for 4 days at 20° C. After soaking for 4 days, the calcium carbonate sample in the freshly prepared PPA solution had 60% of the oil removed, while the calcium carbonate sample in the aged PPA solution had only 30% of the oil removed. This result demonstrates that the aged PPA may have diminished performance after partial hydrolysis, but that it is still able to remove from the calcium carbonate sample.

Example 20: Effect of PPA Hydrolysis at 50° C.

To determine the effect of PPA hydrolysis on chisel performance, a solution of 1% PPA in water was prepared and held at 50° C. for 1 day. The aged 1% PPA solution was compared with a freshly prepared 1% PPA solution in oil removal tests. For these tests, oil coated calcium carbonate samples were soaked in the PPA solutions for 1 day at 50° C. After soaking for 1 day, the calcium carbonate sample in the freshly prepared PPA solution had 100% of the oil removed, while the calcium carbonate sample in the aged PPA solution had only 50% of the oil removed. This result, compared to Example 19, demonstrates that the PPA is more effective as a chisel at 50° C. than at 20° C. for speed and efficiency of oil removal. The result in Example 20 also demonstrates that the performance of PPA declines faster at elevated temperatures, likely due to hydrolysis of the PPA.

Example 21: Comparison of the Efficiency of Materials Containing Phosphoric or Phosphonic Groups to Remove Oil from Calcium Carbonate Surfaces This example demonstrates the efficiency of polyphosphoric acid in removing oil from a carbonate surface in comparison to other chemicals containing phosphoric or phosphonic groups.

Several vials were prepared containing approximately 2 g of the "oil-wet CaCO$_3$ particles", described above, and 4 ml of the aqueous test solutions as shown in Table 8. In all the cases the aqueous solutions contain 1 wt % of Tergitol 15-S-40 and 1.57 mmol % (mmol per 100 mL) of phosphoric/phosphonic groups. The only difference between the test solutions was the chemical that carries the phosphoric/phosphonic groups. Table 8 lists the aqueous solutions used in this example.

TABLE 8

Test solutions containing 1 wt % of Tergitol 15-S-40 and 1.57 mmol % of phosphoric/phosphonic groups.

| Experiment # | Phosphoric/phosphonic-containing chemical |
| --- | --- |
| 21.1 | Polyphosphoric acid |
| 21.2 | Phosphoric acid |
| 21.3 | Glycerol phosphate-di-Na salt |
| 21.4 | Glycerol phosphate |
| 21.5 | Diethylenetriamine pentakis (methylphosphonic acid) |

The vials were placed in an oven at 40° C. and the percentage of the cleaned carbonate particles was estimated visually after 2 days. Table 9 shows the results of the test.

TABLE 9

Percentage of cleaned carbonate particles after 2 days.

| Experiment # | % of clean particles |
| --- | --- |
| 21.1 | 100 |
| 21.2 | 0 |
| 21.3 | 0 |
| 21.4 | 10 |
| 21.5 | 25 |

This Example shows an advantage in using polyphosphoric acid over phosphoric acid in removing oil from calcium carbonate surfaces. The example also compares the performance of glycerol phosphate, which is a small organic molecule containing one phosphate group, to polyphosphoric acid which has several phosphate groups per chain. As shown in the Example, glycerol phosphate removes relatively little oil from the carbonate surface in either the salt or acid form. The Example also compared the performance of an organic molecule containing 5 phosphonic groups branched from the center of the molecule to polyphosphoric acid which is a linear structure of phosphoric groups. The polyphosphoric acid shows an advantage over the Diethylenetriamine pentakis (methylphosphonic acid).

Example 22: Preparation of Polyphosphate Solutions

A polyphosphoric acid (PPA) solution in tap water was formulated by diluting 4.3 g PPA to 100 g final mass with Cambridge, Mass. tap water. The resulting solution was then used as a treatment fluid. A sodium tripolyphosphate (STPP) solution in tap water was formulated by dissolving 13 g STPP in 100 g Cambridge, Mass. tap water. The resulting solution was then used as a treatment fluid. A sodium hexametaphosphate (SHMP) solution was formulated by dissolving 10 g SHMP in 100 g Cambridge, Mass. tap water. The resulting solution was used as a treatment fluid.

Example 23: Preparation and Treatment of Calcium Carbonate Particles

Aragonite sand was sieved to +18 mesh, washed with tap water until water was clear and dried in an oven at about 100° C. overnight. The aragonite was then treated with different solutions by placing 2 g of mineral in a test tube, adding a certain volume of treatment fluid to the test tube, inverting the test tube several times to mix the mineral with the treatment fluid, and then decanting the fluid from the particles. In each case the aragonite was allowed 20 minutes of contact time with the treatment fluid. After decanting the treatment fluid, the aragonite was dried in an oven at 100° C. until moisture content was less than 0.2 wt %. Formulated samples were screened in a wettability test.

Example 24: Test Tube Wettability of Calcium Carbonate Particles

Treated aragonite sand was qualitatively tested for wettability by observing the ability of water to displace oil from the sand. To a test tube was added 2 g of treated aragonite. A crude oil sample having an API gravity of about 12 and a viscosity of about 7,000 cP at 25° C. was added to the test tube at about 5 wt % of the aragonite. Test tubes were vortex mixed to distribute the oil throughout the aragonite sample. In some cases the crude oil was blended with n-decane to achieve an API gravity of about 27 before adding to the aragonite. Blending the viscous oil improved the ability of the oil to distribute throughout the aragonite sample. Immediately after mixing the oil with the aragonite, 5 mL of Cambridge, Mass. tap water was added to the test tube and the test tube was inverted 2-3 times. A visual estimate of the amount of oil displaced by water addition was made by observing how clean the aragonite particles were at the end of the test. Cleaner particles indicated a higher amount of displaced oil and a stronger water-wet state of the treated aragonite. These results are shown in Table 10 below.

TABLE 10

Test Tube Wettability Results

| Test ID | Treatment Fluid ID | Treatment Fluid Volume (mL) | Oil API | Clean Rating* |
|---|---|---|---|---|
| 1 | Cambridge Tap Water | 5.0 | 27 | OS |
| 2 | PPA | 5.0 | 27 | VC |
| 3 | PPA | 2.0 | 27 | C |
| 4 | PPA | 1.0 | 27 | C |
| 5 | PPA | 0.5 | 27 | OS |
| 6 | STPP | 5.0 | 27 | VC |
| 7 | STPP | 3.0 | 27 | VC |
| 8 | STPP | 1.0 | 27 | VC |
| 9 | STPP | 0.5 | 27 | C |
| 10 | STPP | 0.2 | 27 | C |
| 11 | STPP | 0.1 | 27 | SC |
| 12 | SHMP | 2.0 | 12 | VC |
| 13 | SHMP | 1.0 | 12 | VC |

*VC = very clean, C = clean, SC = somewhat clean, OS = oil soaked

Example 25: Chisel Solution Preparation

To make a 0.25% chisel solution, 0.25 g of polyphosphoric acid (115% as $H_3PO_4$) and 0.05 g of Tergitol 15-S-12 were added to a 250 mL beaker. Water was added to the beaker until the total mass of solution was 100.00 g. The solution was mixed with a stir bar until it became uniform. In this basic case, the water sample used was tap water, but solutions of formation brine or a mixture of tap water and formation brine can be used instead.

Example 26: Low Viscosity Chisel Concentrate Preparation

To make a 50% PPA/50% acetic acid solution, 50.0 g of polyphosphoric acid (115% as H3PO4) was added to a FlackTek cup. 53.0 mL of glacial acetic acid (99.7% pure) of a density of about 1.05 g/mL was added to the cup. The cap was placed on the cup, and the cup was agitated until a uniform solution was formed. Depending on the degree of mixing, the process can take from about an hour to about a day to produce a uniform solution. Other ratios of acetic acid and PPA can be made with this method.

Example 27: Chisel Solution Preparation

To make a 0.25% chisel solution, 0.50 g of the concentrate of Example 26 and 0.05 g of Tergitol 15-S-12 were added to a 250 mL beaker. Water was added to the beaker until the total mass of solution was 100.00 g. The solution was mixed with a stir bar until it became uniform. In the basic case, the water sample used was tap water, but the same process was done with formation brine and a mixture of tap water and formation brine.

Example 28: Low Viscosity Chisel Concentrate with Surfactant

In a sealable plastic tube, 2.7 g of pure surfactant (ex. Tergitol 15-S-12) was added to 27.3 g of a chisel concentrate of Example 26. The tube was capped and shaken for about an hour until a uniform solution was made.

Example 29: Oily Calcium Carbonate Chips Preparation

Limestone chips of VICAL® 1000 were rinsed in water and drained to remove dust. The chips were then dried in an oven at 80 degrees Celsius. 50.0 g of the Vical was added to a beaker, and crude oil was added to the beaker to cover the Vical. The mixture was mixed for ten minutes, then placed on a 50 mesh screen and placed back in the oven to allow excess oil to drain off for about 4 hours. The material on the mesh was weighed, and the mass difference indicated about a 15% increase in mass due to oil agglomeration. The crude oil used to prepare these samples was a blend of 90% API 13 oil and 10% decane, although pure crude oils and other hydrocarbon mixtures can also be used.

Example 30: Oil-Soaked Limestone Core Preparation

A 1-inch diameter limestone core was cut into 1-inch long pieces, the ends were sanded to smooth any edges, and they were washed in water. The water was drained to remove any dust, and the cores were heated in a vacuum oven at 80 degrees Celsius for a day to remove any moisture. After that, crude oil was added to the cores so that they were completely covered, and the cores were returned to the vacuum oven at 80 degrees Celsius for another three days. The cores were then removed from the oil onto a 50 mesh screen and allowed to drain at 80 degrees Celsius for a day. After being removed from the oven once again, the cores were wiped with paper towels to ensure no more liquid oil was attached to their sides. The crude oil used for these samples was a blend of 90% API 13 oil and 10% decane, although pure crude oils and other hydrocarbon mixtures can also be used.

Example 31: Method for Analyzing the Removal of Oil from Vical

About 0.20 g of oily VICAL® of Example 29 were added to a 9 mL test tube. Next, 5 mL of solution from Example 25 were added to the test tube. The mixture was allowed to sit overnight at room temperature (or in the oven as indicated), and the next morning the % of Vical cleaned was estimated by visual observation.

Example 32: Comparison of Acids in Chisel Tests

Chisel solutions were made using a variety of acids including PPA. These solutions were then used in the test outlined in Example 31 and the amount of VICAL® cleaned was observed. In all tests, tap water was used as the diluting fluid and Tergitol 15-S-40 was used as the surfactant. These results are shown in Table 11 below.

TABLE 11

Comparison of Acids in Chisel Tests

| Acid wt % | Surfactant wt % (actives) | % cleaned Vical |
|---|---|---|
| 0.25% PPA | 1% | 95% |
| 0.13% PPA | 1% | 90% |
| 0.06% PPA | 1% | 50% |
| 0.25% Citric | 1% | 0% |
| 0.25% Acetic | 1% | 0% |
| 0.29% Phosphoric | 1% | 75% |

TABLE 11-continued

Comparison of Acids in Chisel Tests

| Acid wt % | Surfactant wt % (actives) | % cleaned Vical |
|---|---|---|
| 0.25% Pyrophosphoric | 1% | 50% |
| 0.25% EDTA | 1% | 50% |
| 1% HCl | 1% | 70% |
| None | None | 0% |
| 0.25% PPA, 0.25% Acetic | 0.05% | 95% |
| 0.25% PPA, 0.25% Acetic | None | 40% |
| 0.25% PPA | 0.05% | 95% |

Example 33: Validation of PPA Blends with Acetic Acid

Oil-soaked cores of example 30 were made and placed into imbibition cells. The cells were then filled with 33 mL of chisel solutions of Example 25 and 26. The cells were placed in an oven at 40° C. and held for 7 days, and the amount of oil released over that time was compared among all samples. These results are shown in Table 12 below.

TABLE 12

Imbibition Test Results with Different Chisel Solutions

| Water Sample | PPA wt % | Acetic wt % | Surf. wt % | Initial Oil (g) | Liberated Oil (g) | % Recovery |
|---|---|---|---|---|---|---|
| Tap | 0.25 | 0 | 0.05 | 1.81 | 0.65 | 36 |
| Tap | 0.25 | 0 | 0.05 | 1.74 | 0.67 | 38 |
| Tap | 0.25 | 0 | 0.05 | 1.79 | 0.65 | 36 |
| Tap | 0.25 | 0.25 | 0.05 | 1.82 | 0.76 | 42 |
| Tap | 0.25 | 0.25 | 0.05 | 1.79 | 0.67 | 37 |
| Tap | 0 | 0 | 0.05 | 1.75 | 0 | 0 |
| Brine* | 0.25 | 0 | 0.1 | 1.74 | 0.57 | 33 |
| Brine* | 0.25 | 0.25 | 0.1 | 1.61 | 0.38 | 24 |

*Brine contained 34,000 ppm total dissolved solids (TDS), 4800 mg/L hardness as $CaCO_3$, with pH 5.

Example 34: Viscosity Reduction

Mixtures of polyphosphoric acid (115%) from Special Materials Co. and glacial acetic acid from Aldrich were made in 50 mL centrifuge tubes. The tube was placed on a scale and the desired amount of PPA was weighed out. Acetic acid was then added volumetrically, assuming a density of 1.06 g/cc. The tubes were shaken first by hand, and then agitated overnight on a bottle roller. The viscosity was measured using a Brookfield DV-III viscometer and appropriate spindle (LV2, LV3 or LV4). These results are shown in Table 13 below.

TABLE 13

Viscosity Reduction of PPA by Dilution with Acetic Acid

| % PPA in blend | % Acetic acid in blend | Viscometer Spindle | Viscometer RPM | Sample Temp. (° C.) | Viscosity (cP) |
|---|---|---|---|---|---|
| 100 | 0 | LV4 | 10 | 25 | 15,200 |
| 90 | 10 | LV4 | 10 | 25 | 13,700 |
| 75 | 25 | LV4 | 30 | 25 | 5960 |
| 70 | 30 | LV4 | 60 | 25 | 4100 |
| 60 | 40 | LV4 | 60 | 25 | 1200 |
| 50 | 50 | LV3 | 60 | 25 | 360 |
| 50 | 50 | LV3 | 30 | 8 | 1160 |
| 50 | 50 | LV3 | 10 | 2 | 1620 |

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of reducing the attachment of oil to a surface, comprising:
   directing a formulation into contact with the surface, wherein the formulation comprises a polyphosphoric acid oligomer or polymer, or an ester or a salt thereof (collectively PPA), dissolved in acetic acid, wherein the acetic acid is present in the formulation in an amount effective to delay hydrolysis of the PPA in an aqueous environment, and wherein the formulation renders the surface water-wet thereby reducing the attachment of oil thereto.

2. The method of claim 1, wherein the surface is selected from the group consisting of a $CaCO_3$ surface, a silica surface, and a metal surface.

3. The method of claim 1, further comprising the step of exposing the surface to a surfactant prior to, simultaneous with, or following the step of directing the formulation into contact with the surface.

4. The method of claim 1, wherein the PPA is selected from the group consisting of ammonium polyphosphate, sodium polyphosphate, potassium polyphosphate, sodium tripolyphosphate, sodium hexametaphosphate, sodium trimetaphosphate, and superphosphate.

5. The method of claim 1, wherein the viscosity of the formulation is less than 1000 cP.

6. The method of claim 1, wherein the PPA is a salt of a polyphosphoric acid oligomer or polymer.

7. The method of claim 6, wherein the PPA is a tripolyphosphate, trimetaphosphate, or hexametaphosphate salt.

8. The method of claim 1, wherein the PPA is an ester.

9. A method for recovering oil from a formation containing oil retained on a rock surface, comprising:
   directing a formulation to contact the rock surface, wherein the formulation comprises a polyphosphoric acid oligomer or polymer, or an ester or a salt thereof (collectively PPA), dissolved in acetic acid, wherein the acetic acid is present in an amount effective to delay hydrolysis of the PPA in an aqueous environment, and wherein the formulation renders the rock surface water wet thereby impairing the attachment of oil thereto; and recovering the oil from the formation after the attachment of the oil to the surface has been impaired by the preceding step.

10. The method of claim 9, wherein the rock is calcium carbonate rock.

11. A method of mobilizing oil from a reservoir formation, comprising:

fracturing the formation with an oil retrieval formulation wherein the oil retrieval formulation comprises a polyphosphoric acid oligomer or polymer, or an ester or a salt thereof (collectively PPA), dissolved in acetic acid, wherein the acetic acid is present in an amount effective to delay hydrolysis of the PPA in an aqueous environment, thereby mobilizing the oil for retrieval.

12. A method of preconditioning a petroleum-bearing reservoir, comprising:

adding a formulation to a petroleum-bearing reservoir prior to carrying out an oil production process from the reservoir, wherein the formulation comprises a polyphosphoric acid oligomer or polymer, or an ester or a salt thereof (collectively PPA), dissolved in acetic acid, wherein the acetic acid is present in an amount effective to delay hydrolysis of the PPA in an aqueous environment;

wherein the formulation pretreats the reservoir to facilitate oil production therefrom.

13. The method of claim 12, wherein the petroleum-bearing reservoir is an oil sands reservoir.

14. The method of claim 13, wherein the oil production process is a steam-assisted gravity drainage process.

15. A method of preventing deposition of an oil on a surface, comprising:

directing a formulation into contact with the surface, wherein the formulation comprises a polyphosphoric acid oligomer or polymer, or an ester or a salt thereof (collectively PPA), dissolved in acetic acid, wherein the acetic acid is present in an amount effective to delay hydrolysis of the PPA in an aqueous environment; and exposing the surface to the formulation to prevent deposition of the oil thereupon.

16. The method of claim 15, wherein the surface is a metal surface.

17. The method of claim 15, wherein the formulation is directed by continuous feeding into contact with the surface.

18. The method of claim 15, wherein the surface is exposed to the formulation prior to exposing the surface to the oil, thereby preventing subsequent corrosion or fouling of the surface by the oil.

19. A method of facilitating the removal of oil residua from a near wellbore region, comprising:

directing a formulation into contact with the near wellbore region to impair attachment of the oil residua thereto, wherein the formulation comprises a polyphosphoric acid oligomer or polymer, or an ester or a salt thereof (collectively PPA), dissolved in acetic acid, wherein the acetic acid is present in an amount effective to delay hydrolysis of the PPA in an aqueous environment, thereby loosening the oil residua and facilitating its removal from the near wellbore region.

20. The method of claim 19, wherein the step of directing the formulation into contact with the near wellbore region is associated with a treatment process selected from the group consisting of waterflood, steamflood, squeeze treatment, acidizing, or acid fracturing.

21. The method of claim 19, wherein the oil residua comprise asphaltenes, paraffins or waxes.

* * * * *